INVENTORS
Achim Kulling
Hans Steinbach
Hans Thumm

BY
AGENT

United States Patent Office 3,457,038
Patented July 22, 1969

3,457,038
PROCESS FOR THE MANUFACTURE OF A RUTILE PIGMENT BY REACTING TITANIUM TETRACHLORIDE WITH OXYGEN OR GASES CONTAINING OXYGEN
Achim Kulling, Opladen, Hans Steinbach, Bergisch-Gladbach, and Hans Thumm, Leverkusen, Germany, assignors to Titangesellschaft m.b.H., Leverkusen, Germany, a corporation of Germany
Filed Sept. 29, 1966, Ser. No. 583,019
Claims priority, application Germany, Dec. 11, 1965, T 29,995
Int. Cl. C01g 23/04
U.S. Cl. 23—202       4 Claims

ABSTRACT OF THE DISCLOSURE

The disclosure is of improved method and means for cooling $TiO_2$ burdened reaction gases by the counter-current flow of a cooling gas such that the $TiO_2$ burdened reaction gases are cooled rapidly to a temperature below about 1250° C. so as to prevent further $TiO_2$ particle growth but not below 800° C. thereby to permit substantially complete rutilization of the $TiO_2$.

---

In the manufacture of titanium dioxide pigments by the reaction of titanium tetrachloride with oxygen or gases containing oxygen, the starting materials for the reaction and, as the case may be, a combustible auxiliary gas, are introduced into a reaction chamber and reacted there at high temperatures. At first fine $TiO_2$ particles which consist largely of anatase are formed in the reactor in the hot reaction mixture. These particles grow in size within the hot reaction zone and simultaneously a transformation of the $TiO_2$ from the anatase form to the rutile form takes place. This transformation will be called "rutilization" for short in the following text.

By maintaining certain temperatures, selection of suitable flow conditions, addition of inert auxiliary gases and substances accelerating rutilization as, for example, aluminum chloride, grain growth and rutile formation are influenced (British Patent No. 686,570). Even after the reaction has been completed, particle growth continues owing to the high temperatures prevailing in the reaction chamber; also the transformation of anatase $TiO_2$ into rutile $TiO_2$ is continued. As soon as the titanium dioxide particles have reached a size favorable for pigment purposes the gas mixture must be cooled in order to prevent further growth of the particles. For this purpose the reaction mixture is transferred from the reaction chamber into a mixing chamber where cooling takes place by the addition of cold gas. The cooled reaction mixture is then removed from the mixing chamber and the pigment separated from it.

In order to achieve in a short period an effective cooling of the hot reaction mixture leaving the reaction chamber, the cold gas employed up to now for cooling was introduced directly into the mixing chamber at the point where the hot reaction mixture entered the mixing chamber (German Patent No. 915,082; U.S. Patent No. 2,508,272). Thus cooling took place within a relatively short time from the high temperatures prevailing in the reaction chamber (ca. 1300–1600° C.) down to below 800° C. In cooling the reaction mixture in this manner, not only the particle growth, but also rutilization, ceased. As a consequence a rutile pigment with good optical properties was obtained. However, the pigment still contained 1–3% anatase. Although this pigment is suitable for many purposes its resistance to chalking may still be improved by further lowering of the anatase content. In fields of application in which extraordinarily good resistance to chalking of the pigment is most important, it would be desirable to produce a rutile pigment which, in addition to having good characteristics such as, for example, gloss retention, tinting strength, color tone, etc., contains less than 1% anatase; and under certain conditions even less than 0.5% anatase. Attempts have been made to reduce the anatase content of the pigment by increasing the $AlCl_3$ addition in the reaction chamber. An increase of the $AlCl_3$ content to ca. 3%, calculated as $Al_2O_3$ will produce rutile pigments with an anatase content as low as from 1 to 1.5%, while a further increase of the $AlCl_3$ addition is ineffective. Also, attempts have been made to increase the retention time of the reaction mixture in the reaction chamber by increasing the length of the reaction chamber in order to achieve complete rutilization. However, by so doing an excessive particle growth takes place so that the other pigment properties of the pigment are impaired. The same result is observed if the temperature in the mixing chamber is too high.

An object of the instant invention therefore is to produce a rutile titanium dioxide pigment by a vapor phase reaction of titanium tetrachloride and oxygen wherein the pigment will have an anatase content of less than 1.0% and in addition will possess good pigment properties. A further object is to provide an apparatus for carrying out a vapor phase reaction between titanium tetrachloride and oxygen to produce a rutile titanium dioxide pigment having a content of anatase below 1.0%.

These and other objects, features and advantages of the invention will become more apparent from the following and more complete description taken with the drawings in which.

Figure 1:
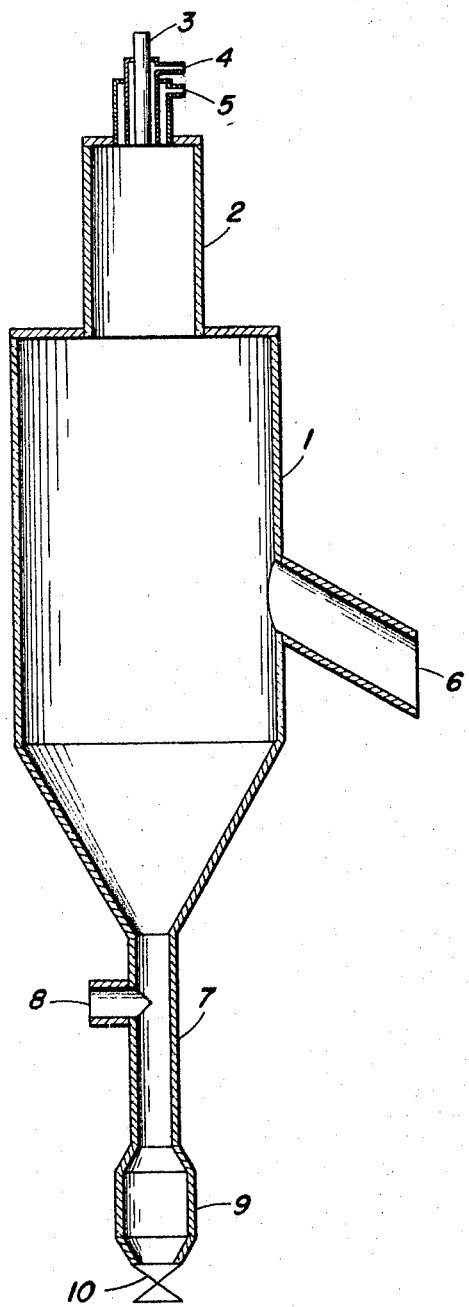
FIG. 1 is a vertical elevation in section of one form of apparatus for carrying out the process of the present invention.

Broadly the instant invention contemplates a new process for the manufacture of a rutile pigment with a very low anatase content which comprises reacting titanium tetrachloride with oxygen or gases containing oxygen in a reaction chamber with subsequent cooling of the reaction mixture by mixing it with cold gas in a mixing chamber. The process is characterized in that the reaction mixture leaving the reaction chamber comes first in contact with gas that has a temperature low enough so that essentially no further grain growth takes place, but that, on the other hand, is high enough so that the rutilization progresses at an appreciable rate; the reaction mixture being cooled down further only when the anatase content of the rutile pigment has been sufficiently lowered. It is particularly advantageous if the gas coming initially into contact with the reaction mixture has a temperature of from 800–1250° C.

In the first contact of the reaction mixture with the gas the temperature range of the latter is such that the reaction mixture is only slightly cooled, i.e., the reaction mixture is cooled sufficiently to preclude further particle growth of the pigment but not low enough to inhibit rutilization which still progresses at an appreciable rate. When the mixture remains for an adequate period in this temperature range, then the rutile pigment produced has a very low anatase content of below 1%, or even under 0.5% under certain conditions, without impairing the other pigment properties. As soon as the anatase content of the rutile pigment has been rduced sufficiently, then the reaction mixture may be cooled down further.

It is of great importance when carrying out the process according to the invention that the reaction mixture (in the part of the mixing chamber in which the rutilization progresses) does not come in contact with cooling gases that are too cold. Even small amounts of such gases upon contact with the reaction mixture have the effect of stopping rutilization. Moreover, the disturbed rutile formation cannot be resumed by subsequent increase of the temperature.

The cooling gas employed for carrying out this process, according to the invention and coming first in contact with the reaction mixture may be a single gas or a mixture of gases. The gas or gas mixture may contain fine particles of solid substance, e.g. pigment particles. For example, it is expedient to use a gas that had been produced by mixing some of the reaction mixture wherein the pigment particles show a sufficiently low anatase content, with colder gas.

A particularly advantageous form of carrying out the process according to the invention is characterized in that the cold gas is introduced into the mixing chamber at a place distant from the reaction chamber and flows toward the reaction chamber in a direction countercurrent to the direction of flow of hot reaction mixture. Thus the gradual cooling of the hot reaction mixture is effected. The cold gas which may have any desired low temperature, e.g., room temperature, upon entering the mixing chamber comes first into contact with a gas mixture which has already been cooled and contains titanium dioxide, the particles of which have a sufficiently low anatase content. By mixing the cold gas with this cool gas mixture, there is obtained a mixture of gases in the mixing chamber that increases in temperature with decreasing distance from the reaction chamber until it has a temperature, for example, of over 800° C. at or adjacent the reaction chamber. The hot reaction mixture entering the mixing chamber from the reaction chamber and containing particles high in anatase, comes first into contact with this relatively cool mixture of gases and is cooled thereby to a temperature above 800° C. Hence further particle growth is inhibited but rutilization progresses in the reaction mixture until the anatase content has been sufficiently lowered. Thereafter the reaction mixture is cooled during its progress downwardly towards the incoming cold gas, to temperatures below 800° C.

The mode of action is conditioned on the mutual arrangement of the reaction chamber and the cold gas inlets in the mixing chamber. In this, size and shape of the mixing chamber and the amount and mode of addition of the cold gas play a role, wherein these figures depend, in addition, also on the amount of reaction mixture put through per unit of time.

In a preferred form of carrying out the process of the invention the cold gas is introduced into the mixing chamber at the end opposite the reaction chamber.

The cold gas may be introduced at a single place distant from the reaction chamber or it may enter the mixing chamber at several places simultaneously and at one or more different distances from the reaction chamber wherein it may have equal or different temperature at the various places.

Any gas that is inert toward the reaction mixture under the conditions in the mixing chamber may be used, e.g., air, nitrogen, carbon dioxide or chlorine. Preferably, waste gas from the reaction, free from $TiO_2$ and cooled, may be used as cold gas.

The cooled reaction mixture may be removed from the mixing chamber either near to the cold gas inlet or at a place at a distance from the cold gas inlet. It is preferably expedient to direct the reaction mixture from the reaction chamber into the mixing chamber from the top and the cold gas from below and to draw off the cooled reaction mixture from the side of the mixing chamber. In this preferred mode of operation the larger $TiO_2$ particles will pass downwardly through the cold gas inlet and hence be separated from the finer pigment particles.

Suitable conditions for carrying out the process must in each case be determined by experiments. They depend on the type of reaction, e.g., whether the reaction between titanium tetrachloride and oxygen or a gas containing oxygen is carried out with or without auxiliary flame, whether inert gas is additionally introduced into the reaction chamber or whether the reaction chamber is cooled from the outside. Also, the amount of aluminum chloride or, as the case may be, other compounds added in the reaction, play a role in carrying out the process according to the invention.

The invention also contemplates an apparatus for carrying out the instant invention which comprises a mixing chamber; a reaction chamber at one end of the mixing chamber fitted with inlet pipes for the starting materials of the reaction and, as the case may be, a combustible auxiliary gas; a discharge pipe for the cooled reaction mixture; and one or more inlet pipes for the cold gas, wherein these pipes enter the mixing chamber at a place distant from the reaction chamber.

FIG. 1 shows a suitable apparatus for carrying out the process of this invention. The apparatus consists of a mixing chamber 1 having a reaction chamber 2 at its upper end. The reaction chamber 2 is, in turn, fitted at its upper end with inlet pipes 3, 4 and 5 for titanium tetrachloride, oxygen or a gas containing oxygen and, as the case may be, a combustible auxiliary gas, respectively. Intersecting the side wall of the mixing chamber is a discharge pipe 6 for discharging the cooled gas mixture from the mixing chamber 1. For the introduction of cold gas an inlet 7 is situated at the lower end of the mixing chamber 1. The inlet 7 has a sidewise opening 8. Below the inlet 7 is a receiving vessel 9 in which any coarse titanium dioxide particles dropping from the mixing chamber countercurrent to the flow of cold gas upwardly through inlet 7 may be caught and removed through valve 10.

Figure 2:
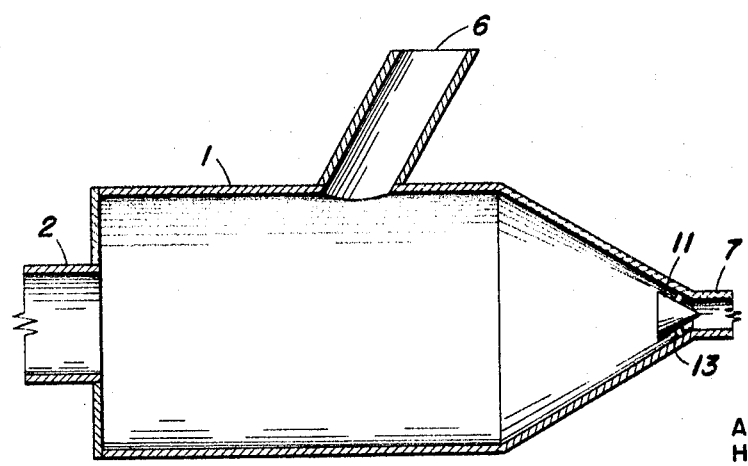
FIG. 2 is a fragmentary vertical elevation in section of the apparatus of FIG. 1 showing a gas distributor in the gas inlet of the mixing chamber.

A modification of the cold gas inlet is shown in FIG. 2 in which a cone-shaped gas distributor 11 is secured by brackets 13 to the inner wall of the mixing chamber immediately above the place where the inlet 7 enters the mixing chamber 1. The distributor 11 produces an expeditious mixing of the cold gas introduced from below into the mixing chamber.

Figure 3:
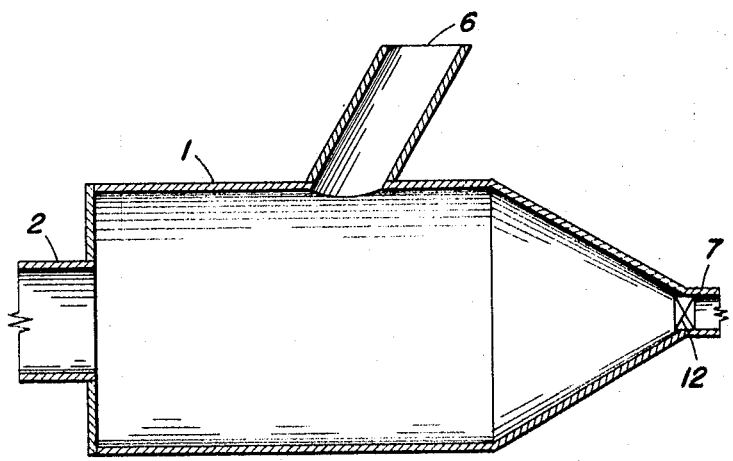
FIG. 3 is similar to FIG. 2 but shows a modification of the gas distributor in the inlet pipe to the mixing chamber.

Another modification of the cold gas inlet is shown in FIG. 3 in which guiding plates 12 are secured to the walls of the mixing chamber at the place where the inlet 7 enters the mixing chamber 1. The guiding plates 12 produce a torque to the incoming cold gas thereby aiding the mixing of the cold gas in the mixing chamber.

Figure 4:
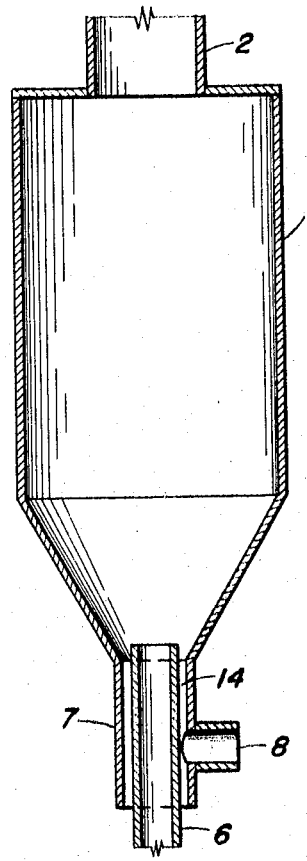
FIG. 4 is a further modification of the apparatus of FIG. 1 wherein both the cold gas inlet and the discharge pipe for the cooled pigment are located at the bottom of the mixing chamber.

FIGURE 4 shows another modification of the apparatus of FIG. 1 wherein the discharge pipe 6 for the cooled reaction mixture is located at the bottom of the mixing chamber 1. The discharge pipe 6 is concentrically arranged within a cold gas inlet 7 but is separated therefrom in a manner such that an annular opening 14 is provided between the discharge pipe 6 and the cold gas inlet 7. The inlet 7 is closed at its bottom end and has a side opening 8. The cold gas enters through opening 8 into the inlet 7 and arrives at the mixing chamber 1 through the annular opening 14.

The mixing chamber may consist of a cylindrical upper section with a conical section joining it to the cold gas inlet. It may, however, be formed cylindrically or conically along its entire length. It also may have instead of a circular cross-section any other desired cross-section, e.g., a square one. Instead of one cold gas inlet pipe 7 several pipes may be provided which enter the lower part of the mixing chamber from below and/or from the side. The addition of a cold gas may also be carried out through a sieve-like bottom plate in the mixing chamber. Additional inlets for gases may enter at the side of the mixing chamber at varying distances from the reaction chamber. The device may also be built in such a manner that the hot reaction mixture enters the mixing chamber from the side thereof; and the cold gas enters the mixing chamber at a point distant from the inlet for the hot reaction mixture. The device may consist of metal or a ceramic material. It may also be equipped with cooling devices, such as, for example, a water cooled jacket.

The following examples will explain the invention in some detail. The anatase content of the pigment obtained was determined by X-ray. Furthermore, the tinting strength of the pigment was determined according to the following standarized laboratory method:

A carbon black mixture was prepared from 5.6 g. carbon black and 1500.0 g. precipitated calcium carbonate. A sample paste was made from 1.0 g. of this carbon black mixture plus a definite amount of the pigment to be tested and 0.425 g. linseed oil.

Also a standard paste of 1.0 g. of the carbon black mixture plus a definite amount of a standard pigment and 0.425 g. linseed oil was prepared. The sample paste and the standard paste were coated side by side on an object carrier and the coats observed visually at their back through the glass plate and their brightness compared. In case the sample paste was brighter, a new sample paste was made with smaller amount of pigment; on the other hand, if the standard paste was brighter, a new sample paste was made with a larger amount of pigment. The amount of pigment to be tested was varied until the brightness of the sample paste was equal to that of the standard paste. A numerical value of the tinting strength was calculated as 100 times the reciprocal value of the pigment weight in grams which had the same brightness as the standard paste. The greater this numerical value, the better is the tinting strength of the pigment. In the examples which follow the amount of oxygen, carbon monoxide and cold gas in cu. in./hr. are based on standard temperature and pressure.

EXAMPLE 1

The apparatus shown in FIGURE 1 was employed. The mixing chamber consisted of a cylindrical member 80 cm. high with an I.D. of 50 cm. which was adjoined below by a cone-shaped member having a height of 60 cm. and an I.D. of 15 cm. at its lower end. Above the mixing chamber was a cylindrical reaction chamber which had a length of 80 cm. and an I.D. of 22 cm. and which was fitted with a burner consisting of three coaxially arranged inlet pipes 3, 4 and 5. The cold gas inlet 7 consisted of a pipe having an inner diameter of 15 cm. The discharge pipe 6 for the cooled gas mixture branched off sidewise 60 cm. below the upper edge of the mixing chamber and had an I.D. of 20 cm. Within the mixing chamber and the discharge pipe was a series of measuring places (not shown in FIG. 1) for measuring the temperature and temperature profile in the device.

Through the inner inlet pipe 3 were added 500 kg./hr. gaseous titanium tetrachloride which had been preheated to a temperature of 350° C. and to which 11.5 kg. aluminum chloride (corresponding to 2.1% $Al_2O_3$ on pigment basis) had been added; through the outer inlet pipe 4 were added 98 cu. m./hr. oxygen preheated to 250° C.; while through the outer outlet pipe 5 46 cu. m./hr. carbon monoxide at room temperature were introduced and brought to reaction in the reaction chamber 2. Through inlet pipe 7 400 cu. m./hr. cold gas (waste gas from the reaction that had been freed from titanium dioxide and cooled to room temperature) were introduced. The gas mixture drawn off through the discharge pipe 6 had a temperature of 730° C. The rutile pigment separated from this gas mixture had an anatase content of 0.4% and a tinting strength of 1800.

EXAMPLES 2-3

Examples 2 and 3 were run as controls wherein Example 1 was repeated but with the difference that inlet 7 was closed and the cold gas introduced into the upper end of the mixing chamber. The product obtained comprised a rutile pigment that showed an anatase content of 2.5%. In Example 3 the aluminum chloride addition was increased up to 17.7 kg./hr. (corresponding to 3.2% $Al_2O_3$, on pigment basis) and resulted in a rutile pigment containing 1.3% anatase which was still considerably more than the pigment produced according to Example 1. Both control pigments had a tinting strength of 1800.

EXAMPLE 4

Example 1 was again repeated with the one difference being that the aluminum chloride addition was only 8.3 kg./hr. (corresponding to 1.5% $Al_2O_3$, on pigment basis). A rutile pigment with 0.9% anatase was obtained, its tinting strength being 1800.

EXAMPLE 5

When Example 4 was repeated with the difference that the inlet 7 was closed and the cold gas was introduced from above into the mixing chamber, a rutile pigment was obtained having an essentially higher anatase content of 3.4%, its tinting strength being 1800.

EXAMPLE 6

The apparatus described in FIG. 2 was employed. The mixing chamber had the same dimensions as the mixing chamber employed in Example 1. At the point where the cold gas inlet 7 entered the mixing chamber a cone-shaped gas distributor 11 having at the top a diameter of 17 cm. and a height of 14 cm. was secured by three bracket 13 to the inner wall of the mixing chamber. The distance of the cone-shaped member from the wall of the mixing chamber was 3 cm.

500 kg./hr. titanium tetrachloride preheated to 350° C., 17.7 kg./hr. aluminum chloride (corresponding to 3.2% $Al_2O_3$, on pigment basis), 98 cu. m./hr. oxygen preheated to 250° C. and 46 cu. m./hr. carbon monoxide at room temperature were introduced into the reaction chamber and reacted therein. Through inlet pipe 7 400 cu. m./hr. waste gas from the reaction, freed from $TiO_2$ and cooled to room temperature, were introduced. The reaction mixture drawn off through discharge pipe 6 had a temperature of 730° C. A rutile pigment with an anatase content of 0.3% and a tinting strength of 1800 was obtained.

EXAMPLE 7

The apparatus shown in FIG. 3 was employed. The mixing chamber had the same dimensions as in Example 1. Eight guiding blades 12 were secured in the cold gas inlet 7 directly at its connection with the mixing chamber, the blades being set at an angle of 30° with the horizontal plane.

500 kg./hr. titanium tetrachloride preheated to 350° C. 14.4 kg./hr. aluminum chloride (corresponding to 2.6% $Al_2O_3$, on pigment basis), 98 cu. m./hr. oxygen preheated to 250° C. and 46 cu. m./hr. carbon monoxide of room temperature were introduced into the reaction chamber and reacted therein. Through inlet pipe 7 400 cu. m./hr. waste gas from the reaction, freed from $TiO_2$ and cooled to room temperature, were introduced. The reaction mixture drawn off through discharge pipe 6 had a temperature of 730° C. A rutile pigment with an anatase content of 0.8% and a tinting strength of 1800 was obtained.

EXAMPLE 8

The device shown in FIG. 4 was employed. The mixing chamber consisted of a cylindrical member of 80 cm. height and an I.D. of 50 cm. to which a cone-shaped member having a height of 60 cm. and a diameter of 22 cm. was adjoined at its lower end. Above the mixing chamber was a cylindrical reaction chamber 2 which had a length of 80 cm. and an inner diameter of 22 cm. and which was fitted at its upper end with three coaxially arranged inlet pipes 3, 4 and 5 for titanium tetrachloride, oxygen and carbon monoxide. Two concentric pipes 6 and 7 with an I.D. of 19 and 22 cm. respectively were inserted up into the bottom of the mixing chamber; and between both pipes was an annular slot 14 of 1 cm. width. The outer pipe 7 was closed at its bottom end, and fitted with a lateral opening 8 through which a cold gas could be introduced into pipe 7 and from thence through the annular slot 14 into the mixing chamber 1.

500 kg./hr. titanium tetrachloride preheated to 350° C., 11.5 kg./hr. aluminum chloride (corresponding to 2.1% $Al_2O_3$ on pigment basis), 98 cu. m./hr. oxygen preheated to 250° C. and 46 cu. m./hr. carbon monoxide at room temperature were introduced into the reaction chamber and reacted therein. Through opening 8 400 cu. m./hr. of waste gas from the reaction, freed of titanium dioxide and cooled to room temperature was introduced as cold gas. The reaction mixture drawn off through pipe 6 had a temperature of 730° C. The rutile pigment separated from the reaction mixture had an anatase content of 0.5% and a tinting strength of 1800.

The results of the experiments described in the examples are recorded in the following table:

are given in Example 1. On the ordinate of the graph the temperature is plotted in ° C., and on the abscissa the distance of the point where the temperature is measured from the upper edge of the mixing chamber is plotted in cm. The temperature measurements were made using thermocouples along the axis of the mixing chamber.

Curve 1 shows the temperature profile in the reaction chamber when the cold gas is introduced in the neighborhood of the reaction chamber; and curve 2 shows the temperature profile when the cold gas is added from below through inlet 7. Using the previously known practice of adding the cold gas close to the reaction chamber the reaction mixture leaving the reaction chamber comes immediately into contact with the cold gas (at room temperature) and is cooled rapidly thereby from about 1400° C. to about 760° C. (Curve 1). However when the cold gas is introduced into the lower part of the mixing chamber (Curve 2) the reaction mixture comes into contact first with a mixture of gases at a temperature above 800° C. to about 1250° C., according to the invention, and hence is cooled only to this temperature and maintained at this temperature for some time whereby the transformation of anatase into rutile progresses without the occurrence of further particle growth; and thereafter the reaction is cooled further and is drawn off from the mixing chamber.

While this invention has been described and illustrated by the examples shown, it is not intended to be strictly

| Example No. | Device according to fig. | Cold gas/ vol. cu. m./hr. | Addition/ place of addition | $AlCl_3$ Addition, percent by wt. $Al_2O_3$ on pigment basis | Anatase content | Tinting strength |
|---|---|---|---|---|---|---|
| 1 | 1 | 400 | Below | 2.1 | 0.4 | 1,800 |
| 2 | 1 | 400 | Above | 2.1 | 2.5 | 1,800 |
| 3 | 1 | 400 | do | 3.2 | 1.3 | 1,800 |
| 4 | 1 | 400 | Below | 1.5 | 0.9 | 1,800 |
| 5 | 1 | 400 | Above | 1.5 | 3.4 | 1,800 |
| 6 | 2 | 400 | Below | 3.2 | 0.3 | 1,800 |
| 7 | 3 | 400 | do | 2.6 | 0.8 | 1,800 |
| 8 | 4 | 400 | do | 2.1 | 0.5 | 1,800 |

It can be seen from the table that a rutile pigment with an anatase content of only 0.3 to 0.9% can be obtained without impairing tinting strength if the cold gas is introduced into the mixing chamber from below (Examples No. 1, 4, 6, 7, and 8). If, on the other hand, the cold gas is introduced into the upper part of the mixing chamber a rutile pigment with 1.3 to 3.4% anatase is obtained (Examples 2, 3 and 5). An increase of the aluminum chloride addition leads, indeed, to a certain lowering of the anatase content but this still remains higher than 1% (see Example No. 3). The tinting strength of the rutile pigment manufactured according to the invention is not inferior to that of a pigment higher in anatase produced by earlier known methods in the art.

It may also be seen from the table that a rutile pigment with less than 1% anatase may be produced using very low aluminum chloride additions corresponding only to 1.5% $Al_2O_3$ on pigment basis. (see Example No. 4) whereas when using the practice of adding the cold gas in the vicinity of the reaction chamber, a rutile pigment with a high anatase content of over 3% is obtained when such low aluminum chloride additions are employed. Such a pigment has an unsatisfactory resistance to chalking. (Example No. 5).

When a rutile pigment with an anatase content of from 0.5–1% is desired, which is sufficient for many fields of application, a significant saving of aluminum chloride is achieved in the process according to the invention. Only when a rutile pigment with less than 0.5% anatase is required, it is necessary to employ greater additions of aluminum chloride i.e. from about 2–3%, calculated as $Al_2O_3$, on pigment basis.

Figure 5:
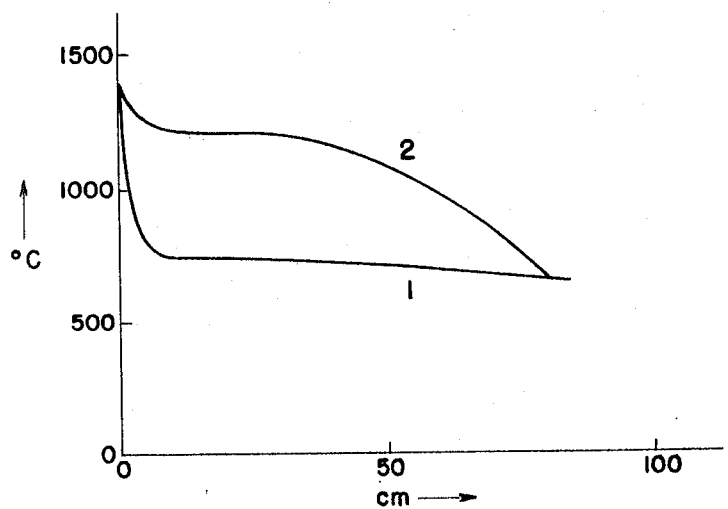
FIG. 5 is a graph comparing temperature profiles in the mixing chamber according to methods of the prior art (curve 1) and according to the present invention (curve 2).

With reference to FIG. 5 this shows the temperature profile in the mixing chamber the dimensions of which limited thereto, and other variations and modifications may be employed within the scope of the following claims.

What is claimed is:

1. In a process for the manufacture of a rutile titanium dioxide pigment in which titanium tetrachloride is reacted with oxygen or oxygen containing gases in a reaction chamber to form $TiO_2$ in both the anatase and rutile modification with subsequent cooling in a cooling chamber of the reaction gases containing the titanium dioxide pigment suspended therein, the improvement which comprises: introducing into said cooling chamber a cooling gas at about 20° C. and at a distance away from the reaction gases entering said cooling chamber such that said cooling gas is heated prior to contacting said entering reaction gases, containing the suspended titanium dioxide pigment particles, to a temperature within a range wherein said particles are cooled relatively rapidly to a temperature no higher than about 1250° C. to prevent further pigment particle growth but above 800° C. to permit rutilization to continue until the amount of anatase $TiO_2$ is less than 1% and then removing the cooled rutile $TiO_2$ pigment from the cooling chamber at a point separate from the cooling gas entrance.

2. Process according to claim 1 in which the cooling gas first coming in contact with the reaction mixture is introduced by mixing a cold gas with previously cooled reaction gas containing pigment particles having less than 1% anatase.

3. Process according to claim 2 in which the cooling gas mixture coming in contact with the reaction mixture has a temperature of from 800° C. to 1250° C.

4. Process according to claim 2 in which the cooling gas mixture is introduced at an end of the cooling chamber opposite the end where the reaction gases enter the cooling chamber, and the cooled rutile pigment suspended in the cooling gas mixture is removed at a point in said cooling chamber intermediate the opposite ends thereof.

References Cited

UNITED STATES PATENTS

| | | | |
|---|---|---|---|
| 2,508,272 | 5/1950 | Booge | 23—202 |
| 2,670,275 | 2/1954 | Olson et al. | 23—202 |
| 2,750,260 | 6/1956 | Nelson et al. | 23—202 |
| 2,957,753 | 10/1960 | Nelson et al. | 23—202 |
| 3,203,763 | 8/1965 | Kruse | 23—202 |
| 3,217,787 | 11/1965 | Preston | 23—202 XR |
| 3,224,215 | 12/1965 | Bramekamp et al. | 23—202 XR |

EDWARD STERN, Primary Examiner

U.S. Cl. X.R.

23—277; 106—300; 165—1